United States Patent [19]

Neigel et al.

[11] Patent Number: 4,464,523

[45] Date of Patent: Aug. 7, 1984

[54] PROCESS FOR THE PREPARATION OF GRAFT COPOLYMERS OF CELLULOSE DERIVATIVES AND DIALLYL, DIALKYL AMMONIUM HALIDES

[75] Inventors: Dennis Neigel, Whitehouse Station; John Kancylarz, Plainsboro, both of N.J.

[73] Assignee: National Starch and Chemical Corporation, Bridgewater, N.J.

[21] Appl. No.: 495,015

[22] Filed: May 16, 1983

[51] Int. Cl.$^3$ .......................... C08L 1/02; C08L 1/08
[52] U.S. Cl. .................................. 527/300; 527/312; 527/313; 424/362; 424/DIG. 2; 523/105
[58] Field of Search ...................... 527/300, 312, 313; 424/361, 362, DIG. 2; 523/105

[56] References Cited

U.S. PATENT DOCUMENTS

| | | | |
|---|---|---|---|
| 3,976,552 | 8/1976 | Fanta et al. | 527/201 |
| 4,056,432 | 11/1977 | Slagel et al. | 527/312 |
| 4,131,576 | 12/1978 | Iovine et al. | 527/201 |
| 4,155,888 | 5/1979 | Mooth | 527/200 |
| 4,283,384 | 8/1981 | Jacquet et al. | 424/71 |
| 4,330,443 | 5/1982 | Rankin | 527/312 |

*Primary Examiner*—John Kight, III
*Assistant Examiner*—Nathan M. Nutter
*Attorney, Agent, or Firm*—Edwin Szala; Ellen T. Dec

[57] ABSTRACT

Graft copolymers of cellulose derivatives and N,N-diallyl,N-N-dialkyl ammonium chlorides or bromides are prepared using a dry or substantially solvent-free system by impregnating a concentrated aqueous solution of the N,N-diallyl-N,N-dialkyl ammonium halide, water soluble surfactant and catalyst onto the dry cellulose substrate, heating the reaction mass for sufficient time to achieve polymerization and then drying.

11 Claims, No Drawings

PROCESS FOR THE PREPARATION OF GRAFT COPOLYMERS OF CELLULOSE DERIVATIVES AND DIALLYL, DIALKYL AMMONIUM HALIDES

BACKGROUND OF THE INVENTION

This invention relates to a process for preparing graft copolymers of cellulose derivatives and N,N-diallyl-N,N-dialkylammonium halides. More particularly, the invention relates to the preparation of such graft copolymers in a dry or substantially solvent-free system.

Graft copolymers of polysaccharides such as starches, cellulose and gums are known in the literature and find uses in a variety of applications including as paper filler retention aids, adhesives, sizings, flocculants, ion exchange resins, drilling and mud additives and water treatment aids. In particular, graft copolymers of cellulose derivatives and N,N-diallyl-N,N-dialkyl ammonium halides have been recognized as superior conditioners in the formulation of shampoos and rinses for application to human hair.

Heretofore, methods employed for the production of such graft copolymers as represented by the teachings of U.S. Pat. Nos. 3,809,664 and 3,976,552, include polymerizations in water, in water-solvent mixtures and in the dry state, and may be initiated by mechanical, chemical and irradiative techniques.

Most of the above-described methods, however, are relatively unsuited for the efficient grafting of water soluble monomers in aqueous environments where polymerization with these monomers would be most desirable, particularly when chemical initiators are employed. This inefficient grafting is mainly due to the strong tendency of these monomers to form separate non-graft polymers in the aqueous phase. For efficient grafting, it is necessary to maintain the polysaccharide substrate and the water soluble monomer(s) in very close contact i.e. at high concentration with respect to the aqueous polymerization medium. In this manner, graft polymerization becomes the dominant reaction and the tendency to form non-graft polymers is minimized.

Several factors, however, prevent the grafting of water soluble monomers to polysaccharide substrates in highly concentrated aqueous environments. With water soluble or dispersed substrates like cellulose derivatives, gums and cooked starches, and the aqueous solution viscosities of even low concentrations (10-20%) of polysaccharide in water are prohibitively high and unmanageable. Thus it is not possible to graft a water soluble monomer, e.g. the N,N-diallyl-N,N-dialkyl ammonium halides to a soluble or dispersed cellulose substrate in water at, for example, 70% solids. With non-dispersed polysaccharide substrates like cellulose, which can be heterogeneously suspended in water at 40-60% solids, the graft product itself once produced in water will swell and exhibit very high viscosities during polymerization. This effect usually leads to coagulation of the reaction mixture making it commercially useless.

It has been proposed in U.S. Pat. No. 4,131,576 to overcome the above mentioned problems by suspending the polysaccharide in an organic polymerization solvent and adding thereto a water solution of the monomer to be grafted. In order to effect the required suspension, it is necessary that at least one of the phases (i.e. the suspended polysaccharide or the aqueous monomer solution) contain a suitable surfactant. While this method is generally satisfactory, it does possess two significant drawbacks. The use of substantial quantities of water and/or organic solvents necessitates costly and time-consuming isolation, washing, drying and solvent recovery steps. Moreover, in the embodiment wherein a water insoluble surfactant is employed, the presence of residual surfactant in the graft copolymer causes undesirable turbidity in any final aqueous products, e.g. hair care products, formulated therewith.

It is therefore an object of the present invention to provide a simple and efficient process for preparing graft copolymers of cellulose derivatives and N,N-diallyl-N,N-dialkyl ammonium halides.

It is also an object of the invention to provide such process wherein the graft polymerization may be carried out in a substantially dry environment requiring little or no water, solvent or water-insoluble surfactants.

It is a further object to provide a process for the production of such graft copolymers which can be isolated directly from the reaction mixture in dry form.

SUMMARY OF THE INVENTION

The above-mentioned and related objects are achieved in accordance with the process of the present invention which comprises impregnating a concentrated aqueous solution of a N,N-diallyl-N,N-dialkyl ammonium halide, water soluble surfactant and catalyst onto a dry cellulose substrate, heating the reaction mass to about 60° to 85° C. and holding at that temperature, with agitation, for a period of 6 to 40 hours. The resultant material is buffered by dry blending, if necessary, to adjust the pH to 6 to 8; and dried until the residual water level is below 7%. The products may then be discharged and screened to yield the final dry graft copolymer.

The process described above results in a number of advantages over the processes of the prior art. Thus this unique process allows the production of graft copolymers using a dry (i.e. solventless) reaction medium with only minimal quantities of water, using only one piece of reaction equipment while permitting a high degree of conversion so as to make subsequent purification unnecessary.

DETAILED DESCRIPTION OF THE PREFERRED EMBODIMENTS

As already described above the graft copolymers prepared herein comprise N,N-diallyl-N,N-dialkyl ammonium halides on cellulose substrates. Useful as substrates herein are cellulose and its derivatives such as, for example, the hydroxyethyl, hydroxypropyl, methyl, ethyl and carboxymethyl derivatives.

The N,N-diallyl-N,N-dialkyl-ammonium halides which are to be graft copolymerized onto the cellulose substrate in accordance with the process described herein are those of the formula:

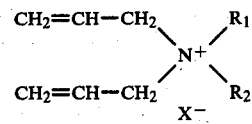

in which each of $R_1$ and $R_2$ represents a linear or branched alkyl radical of 1 to 16 carbon atoms and X is Cl or Br. Particular examples of these compounds are N,N-diallyl-N-methyl-N-dodecylammonium chloride or bromide; N,N-diallyl-N-methyl-N-butylammonium chloride or bromide; N,N-diallyl-N-methyl-N-octylammonium chloride or bromide; N,N-diallyl-N-methyl-N-decylammonium chloride or bromide as well as the preferred N,N-diallyl-N,N-dimethyl ammonium chloride or bromide.

It will be recognized by those skilled in the art that mixtures of the diallyl dialkylammonium halides may be used or that there may also be optionally present at least one copolymerizable comonomer. In order to be useful herein, the comonomers must have a minimum solubility of 5% by weight in water at 25° C., must be unsaturated and capable of polymerizing by free radical initiation. Suitable comonomers include acrylic and methacrylic acid, acrylamide, methacrylamide, mono- or diN-substituted acrylamides and methacrylamide, vinyl pyrrolidone, sodium or ammonium styrene sulfonate, alkyl or hydroxyalkyl acrylates and methacrylates, etc. Thus, for convenience, our use of the term N,N-diallyl-N,N-dialkyl ammonium halide monomer shall be understood to designate any mixture of comonomers to be grafted wherein up to about 25% by weight of the N,N-diallyl-N,N-dialkyl ammonium halide monomer may be replaced by any copolymerizable comonomer(s).

The ratio of comonomer to cellulose will depend upon the particular components and designated end-use thereof. Thus, the total amount of N,N-diallyl-N,N-dialkyl ammonium halide may range from 5 to 50%, preferably 10 to 30%, by weight of the final graft copolymer. If the polymer is to be used in hair care formulations, it is essential that it contains sufficient monomer so as to provide a final nitrogen content within the range of about 0.25 to 4.5%.

The particular N,N-diallyl-N,N-dialkyl ammonium halide is employed in the form of an aqueous solution at a solids content of 50 to 70% and containing a water-soluble surfactant in an amount of from 0.5-5.0 based on the weight of the cellulose substrate. In general, any type of water-soluble surfactant, i.e. nonionic, anionic or cationic, may be employed in the present invention with the anionic and amphoteric surfactants being preferred. Representative surfactants include the anionic surfactants such as sodium lauryl sarcosinate, triethanol amine lauryl sulfate and ammonium lauryl sulfate as well as amphoteric surfactants such as cocamidopropyl betain and the sodium salt of coconut imidazoline.

Other additives conventionally used by those skilled in the art in graft polymerization reaction may generally be added to the aqueous monomer solution. Thus, if buffers are required to regulate the pH, as is the case when peroxydisulfate catalysts are employed, such buffers can be added to the aqueous monomer solution or preblended with the cellulose. Representative buffers useful for the desired neutral pH range include trihydroxymethyl aminomethane, magnesium oxide and disodium monohydrate phosphate.

The catalyst or initiator employed includes any of those conventionally used in the graft copolymerization procedures of the prior art. These catalysts are generally of the type which generate free radical when decomposed under heating. They include the inorganic peroxides (e.g., hydrogen peroxide); persulfates (e.g., ammonium, potassium or sodium persulfates, etc.); azo initiators (e.g., tertiary aliphatic azo compounds which undergo homolytic dissociation) such as azo diisobutyronitrile, phenylazotriphenylmethane, 1,1'azodicyclohexane-carbonitrile, 1,1-dimethylazoethane diazoamino compounds (e.g., 3,3-di-methyl-1-phenyltriazene and arylidiazo thioethers), certain aromatic ketones (e.g., benzoin methyl ether, benzophenone and its derivatives), chlorinated aromatics, mixtures thereof and other free-radical type initiators. The persulfate initiators, especially the ammonium persulfate and the alkali metal persulfates (e.g., potassium, lithium, sodium, etc.) are particularly unique in their ability to serve as catalysts in the present process.

The actual catalyst concentration necessary to generate sufficient free-radicals so as to effect polymerization depends upon the reaction temperature, the reaction time and the free-radical initiating temperature of the initiator. Accordingly, the initator level may vary considerably (e.g. from about 0.01% to about 10% of the monomer weight). Peroxide initiator concentrations are typically greater (e.g., 1-10%) then persulfate initiated systems (e.g. 0.03-3%). The catalyst may be added directly to the aqueous monomer solution or added to the entire reaction mixture as a separate catalyst solution. However, for ease of application, the catalyst is generally added directly to the monomer solution.

In accordance with the graft copolymerization of the present invention, the monomer solution and catalyst, together with any additional components, are impregnated directly onto the cellulose substrate in a vessel provided with agitation. Suitable reaction vessels include blenders or conventional mixers such as sigma blades, ribbon blades, pin blades, etc, which have capabilities of replacing air with an inert gas and maintaining the inert atmosphere. Thorough impregnation of cellulose substrate is most easily accomplished by spraying the aqueous solution directly onto the dry cellulose in the reaction vessel while mixing. Alternatively, the aqueous solution is added to the vessel with the dry cellulose substrate and then mixed. After impregnation is substantially complete, air is replaced with nitrogen and heat is applied to initiate the polymerization. The amount of heat as well as the reaction period will depend, in part, on the particular catalyst employed as initiator as well as the concentration thereof. In general, initators such as the organic and inorganic peroxides and persulfates, etc., will typically require temperatures in excess of 60° C. (e.g. at pragmatic initiator concentrations such a <10% of the monomer weight) to generate free radicals. In the absence of promoter, appreciable free-radical initiation with the persulfate initiators occurs at temperatures of about 60° C. and higher, and especially at temperatures between about 65° C. to about 85° C. These reaction temperatures are maintained until the level of residual monomer in the system is less than about 3% by weight of the total solids. Time periods required are inversely related to the reaction temperatures but, in general, will be for about 6 to 40 hours with most reactions being carried out at temperatures of 65°-75° C. for 6 to 12 hours.

After completion of the reaction, the reaction mass will be in the form of a wet powder which can be readily dried using conventional methods, as in a vacuum dryer, a fluid bed drying apparatus or a roller dryer.

The resultant graft copolymer product is then discharged and screened to the desired size. The product produced by this method is comparable in clarity, conversion, dispersibility and graft substitution to the graft copolymers prepared using the solvent containing procedures of the prior art.

The resultant products find use in a variety of applications. In particular, the products made by this unique process are applicable in conditioning shampoos, hair fixatives, and hair rinses. They may also be used as conditioning agents in permanent waving lotions, hair straighteners, or hair dyes; as fixing agents in hair dyes to facilitate dye pickup and in other topical applications. In general, such conditioning/fixative compositions comprise aqueous or aqueous-alcoholic solutions of the graft copolymer in concentrations of about 0.1 to 10%, preferably 0.5 to 2.5% by weight of the total composition together with other necessary and/or optional functional ingredients.

In the following example, which are merely illustrative of the various embodiments of the present invention, all parts are by weight and all temperatures in degrees Celsius unless otherwise indicated.

EXAMPLE I 1000 lbs. hydroxyethylcellulose (95% solids) were charged in a stainless steel mixing tank equipped with an agitator drive. A monomer solution prepared from 500 lbs. of a 63% solids aqueous solution of N,N-diallyl-N,N-dimethyl-ammonium chloride, 90 lbs. of a 35% solids aqueous solution of cocoamidopropyl betaine, 10 lbs. sodium persulfate and 70 lbs. water, was sprayed onto the cellulose in the tank and the resulting mixture agitated to thoroughly impregnate the cellulose. The tank was then purged with nitrogen for 1 hour and the reaction mass heated to 71° C.±3° C. and held for 6 hours until the residual monomer concentration was less than 3%. Then 13 lbs. of dry sodium phosphate was added and mixed for 30 minutes to a pH of 6.5–7.5. The cake was then transferred to a fluid bed drier and dried at 120° F. for 2 hours to a moisture level of less than 7%. The product was screened through a 30 mesh screen, overs ground and rescreened.

On analysis, the graft copolymer prepared by this process was characterized by a viscosity at 21° C. (in 2% aqueous solution) of 50–400 cps, a clarity (Hach Ratio Turbidimeter) of less than 5 NTU and a percent nitrogen of 1.8 to 2.4, and a percent monomer conversion of 84 to 88%.

Now that the preferred embodiments of the present invention have been described in detail, various modifications and improvements thereon will become readily apparent to those skilled in the art. Accordingly the spirit and scope of the invention are to be limited only by the appended claims and not by the foregoing specifications.

We claim:

1. A process for the preparation of graft copolymers of cellulose and cellulose derivatives and N,N-diallyl-N,N-dialkyl ammonium halide comprising the steps of:

(a) impregnating a concentrated aqueous solution of a N,N-diallyl-N,N-dialkyl ammonium halide, water soluble surfactant and catalyst, at a solids content of 50 to 70% by weight, onto a dry cellulose substrate;
   (b) heating the reaction mass to about 60° to 85° C. and holding at that temperature, with agitation, for a period of 6 to 40 hours;
   (c) adjusting the pH to 5 to 8; and
   (d) drying to a residual water level below 7%.

2. The process of claim 1 wherein the cellulose substrate is selected from the group consisting of cellulose, hydroxyethyl cellulose, hydroxypropyl cellulose, methyl cellulose, ethyl cellulose, carboxymethyl cellulose and carboxylmethylhydroxyethyl cellulose.

3. The process of claim 2 wherein the cellulose substrate is hydroxyethyl cellulose or hydroxypropyl cellulose.

4. The process of claim 1 wherein the N,N-diallyl-N,N-dialkyl ammonium halide is selected from the group consisting of N,N-diallyl-N-methyl-N-dodecylammonium chloride or bromide; N,N-diallyl-N-methyl-N-octyl-ammonium chloride or bromide; N,N-diallyl-N-methyl-N-decyl-ammonium chloride or bromide and N,N-diallyl-N,N-dimethyl ammonium chloride or bromide.

5. The process of claim 4 wherein the N,N-diallyl-N,N-dialkyl ammonium halide is N,N-diallyl-N,N-dimethyl ammonium chloride.

6. The process of claim 1 wherein the N,N-diallyl-N,N-dialkyl ammonium chloride is replaced with up to about 25% by weight of a copolymerizable comonomer.

7. The process of claim 1 wherein the water-soluble surfactant is used in an amount of 0.5 to 5.0 by weight of the cellulose substrate.

8. The process of claim 1 wherein the water-soluble surfactant is anionic or amphoteric.

9. The process of claim 8 wherein the water-soluble surfactant is selected from the group consisting of sodium lauryl sarcosinate, triethanolamine lauryl sulfate, ammonium lauryl sulfate, cocoamidopropyl betaine and sodium salt of coconut imidazoline.

10. The process of claim 1 wherein the catalyst employed is ammonium, potassium or sodium persulfate in an amount of 0.03 to 3% by weight of the N,N-diallyl-N,N-dialkyl ammonium halide.

11. The process of claim 1 wherein the catalyst employed is an inorganic peroxide in an amount of 1 to 10% by weight of the N,N-diallyl-N,N-dialkyl ammonium halide.

* * * * *